US011079901B2

(12) United States Patent
Natarajan et al.

(10) Patent No.: US 11,079,901 B2
(45) Date of Patent: Aug. 3, 2021

(54) SYSTEMS AND METHODS FOR PRESENTING AND DISCOVERING RELATIONSHIPS BETWEEN INFORMATION UNITS

(71) Applicant: GANALILA, LLC, Pleasanton, CA (US)

(72) Inventors: Shreedhar Natarajan, Dublin, CA (US); Jaisree Moorthy, Dublin, CA (US)

(73) Assignee: GANALILA, LLC, Pleasanton, CA (US)

( * ) Notice: Subject to any disclaimer, the term of this patent is extended or adjusted under 35 U.S.C. 154(b) by 496 days.

(21) Appl. No.: 14/775,345

(22) PCT Filed: Mar. 11, 2014

(86) PCT No.: PCT/US2014/023059
§ 371 (c)(1),
(2) Date: Sep. 11, 2015

(87) PCT Pub. No.: WO2014/164634
PCT Pub. Date: Oct. 9, 2014

(65) Prior Publication Data
US 2016/0034115 A1     Feb. 4, 2016

Related U.S. Application Data

(60) Provisional application No. 61/780,614, filed on Mar. 13, 2013, provisional application No. 61/903,318, filed on Nov. 12, 2013.

(51) Int. Cl.
*G06F 3/0482*     (2013.01)
*G06F 3/0481*     (2013.01)
(Continued)

(52) U.S. Cl.
CPC .......... *G06F 3/0482* (2013.01); *G06F 3/0481* (2013.01); *G06F 3/0484* (2013.01);
(Continued)

(58) Field of Classification Search
CPC ......... G06F 2203/04802; G06F 17/246; G06F 17/30011; G06F 17/30592;
(Continued)

(56) References Cited

U.S. PATENT DOCUMENTS

| 5,004,244 A | 4/1991 | Johnson |
| 5,767,854 A * | 6/1998 | Anwar .................. G06F 3/0481 |
| | | 345/419 |

(Continued)

FOREIGN PATENT DOCUMENTS

| JP | 2000305946 A | 11/2000 |
| JP | 2005078633 A | 3/2005 |

(Continued)

OTHER PUBLICATIONS

International Search Report and Written Opinion corresponding to International Patent Application No. PCT/US2014/023059 dated Aug. 5, 2014.

(Continued)

*Primary Examiner* — Andrew L Tank
(74) *Attorney, Agent, or Firm* — Troutman Pepper Hamilton Sanders LLP

(57) ABSTRACT

Systems and methods for presenting data to one or more users in a visualizable format and obtaining information based upon the user's interaction with the data are disclosed. A system may include a processor and a non-transitory, processor-readable storage medium. The non-transitory, processor-readable storage medium may include one or more programming instructions that, when executed, cause the processor to provide data to at least one user via a user
(Continued)

interface, receive one or more inputs from the at least one user, and direct a storage medium to record the one or more inputs. The data may be arranged in a user-visualizable format. The one or more inputs may correspond the user's interaction with the user interface that causes manipulation of the data.

33 Claims, 7 Drawing Sheets

(51) Int. Cl.
    *G06F 3/0484* (2013.01)
    *G06F 16/338* (2019.01)
    *G06F 16/951* (2019.01)
    *G06T 19/20* (2011.01)
    *G06F 16/28* (2019.01)
(52) U.S. Cl.
    CPC ...... *G06F 3/04815* (2013.01); *G06F 3/04847* (2013.01); *G06F 16/338* (2019.01); *G06F 16/951* (2019.01); *G06T 19/20* (2013.01); *G06F 16/284* (2019.01)
(58) Field of Classification Search
    CPC ............. G06F 17/30601; G06F 3/0482; G06F 3/04815; G06F 3/04847; G06F 3/0481; G06F 3/0484; G06F 16/338; G06F 16/951; G06F 16/248; G06K 9/62; H04N 5/44543; G06T 19/20
    See application file for complete search history.

(56) References Cited

U.S. PATENT DOCUMENTS

| | | | | |
|---|---|---|---|---|
| 6,707,454 B1* | 3/2004 | Barg | ................ | G06K 9/6253 345/440 |
| 6,853,389 B1 | 2/2005 | Ikeda | | |
| 7,711,689 B2 | 5/2010 | Kim | | |
| 7,720,857 B2 | 5/2010 | Beringer et al. | | |
| 8,155,453 B2* | 4/2012 | Evans | ................ | G06F 17/3071 382/225 |
| 2001/0049695 A1* | 12/2001 | Chi | ................ | G06F 17/246 |
| 2005/0030309 A1* | 2/2005 | Gettman | ................ | G06F 17/30873 345/419 |
| 2005/0093239 A1 | 5/2005 | Johnston | | |
| 2006/0020538 A1 | 1/2006 | Ram et al. | | |
| 2006/0020898 A1 | 1/2006 | Kim et al. | | |
| 2008/0046450 A1 | 2/2008 | Marshall | | |
| 2008/0162498 A1 | 7/2008 | Omoigui | | |
| 2009/0164945 A1 | 6/2009 | Li | | |
| 2009/0192954 A1 | 7/2009 | Katakuri, Jr. et al. | | |
| 2010/0064259 A1 | 3/2010 | Alexanderovitc et al. | | |
| 2010/0306708 A1 | 12/2010 | Trenz et al. | | |
| 2011/0049807 A1 | 3/2011 | Benty et al. | | |
| 2011/0320454 A1 | 12/2011 | Hill et al. | | |
| 2011/0321097 A1 | 12/2011 | DaCosta | | |
| 2012/0047462 A1 | 2/2012 | Moon et al. | | |
| 2012/0209830 A1* | 8/2012 | Assodallahi | ...... | G06F 17/30643 707/722 |
| 2012/0302337 A1 | 11/2012 | Thakker et al. | | |
| 2012/0324374 A1* | 12/2012 | Karmon | ................ | H04N 21/251 715/760 |
| 2013/0097563 A1* | 4/2013 | Pacheco Rodrigues Velho | .......... | G06F 3/03543 715/850 |
| 2015/0050973 A1 | 2/2015 | Moorthy et al. | | |

FOREIGN PATENT DOCUMENTS

| | | |
|---|---|---|
| JP | 2007066331 A | 3/2007 |
| JP | 2009294993 A | 12/2009 |
| JP | 2011008540 A | 1/2011 |
| JP | 2012247838 A | 12/2012 |
| JP | 2015-523615 A | 8/2015 |
| WO | 0150346 A1 | 7/2001 |

OTHER PUBLICATIONS

International Search Report and Written Opinion corresponding to International Patent Application No. PCT/US2013/037171 dated Sep. 6, 2013.
Final Decision of Rejection issued in Japanese Patent Application No. 2016-501138 dated Jul. 3, 2018.
Kathrine, CatchAppNews—CatchAppNews, "[App Review]" Tracing hidden words to discover "Word Search Puzzle by Hangame", [online],Sep. 9, 2011, Créer, LLC [search Jan. 14, 2019], Internet <URL:http://catchapp.net/contents/story/355>.

* cited by examiner

SYSTEMS AND METHODS FOR PRESENTING AND DISCOVERING RELATIONSHIPS BETWEEN INFORMATION UNITS

CROSS-REFERENCE TO RELATED APPLICATIONS

This application is a U.S. national stage filing under 35 U.S.C. § 371 of International Application No. PCT/US2014/023059 filed Mar. 11, 2014 entitled "Systems and Methods for Presenting and Discovering Relationships Between Information Units", which in turn claims the priority benefit of U.S. Provisional Patent Application No. 61/780,614, filed Mar. 13, 2013 entitled "Systems and Methods For Discovering Relationships Between Information Units" and U.S. Provisional Patent Application No. 61/903,318, filed Nov. 12, 2013 and entitled "Systems and Methods For Discovering Relationships Between Information Units." The contents of both applications are incorporated herein by reference in their respective entireties.

BACKGROUND

With the advent of electronic devices that are nearly always connected to the Internet, users have immediate access to large amounts of data. However, with the additional data available at their fingertips, a user can become overwhelmed if the data is not properly organized in a manner that allows the user to locate the data he/she desires, manipulate the data, interpret the data, and/or visualize the data.

Previous attempts to visualize large amounts of data used hierarchical methods or interconnected methods. However, these attempts have suffered from an inability to properly provide visualizable data within the available screen real estate (such as a user's computer monitor or mobile device screen). These attempts also have an inability to provide the data while mitigating the amount of noise associated with interconnections between data. Furthermore, these attempts have been unable to successfully provide users with a means of overcoming the difficult learning curve necessary to manipulate the data and view various connections between subsets of data. In addition, these attempts have not sufficiently provided users with an ability to use a similar format across varying user interfaces.

SUMMARY

In an embodiment, a system may include a processor and a non-transitory, processor-readable storage medium. The non-transitory, processor-readable storage medium may include one or more programming instructions that, when executed, cause the processor to provide data to at least one user via a user interface, receive one or more inputs from the at least one user, and direct a storage medium to record the one or more inputs. The data may be arranged in a user-visualizable format. The one or more inputs may correspond to the user's interaction with the user interface that causes manipulation of the data.

In an embodiment, a system may include a processor and a non-transitory, processor-readable storage medium. The non-transitory, processor-readable storage medium may include one or more programming instructions that, when executed, cause the processor to provide data to at least one user via a user interface, receive one or more inputs from the at least one user via the user interface, and direct a storage medium to record the one or more inputs. The data may be arranged in a user-visualizable format. The one or more inputs may correspond to user-discovered connections between one or more subsets of data.

In an embodiment, a method may include providing, by a processor, data to at least one user via a user interface, receiving, by the processor, one or more inputs from at least one user, and directing, by the processor, a storage medium to record the one or more inputs. The data may be arranged in a user-visualizable format. The one or more inputs may correspond to user-discovered connections between one or more subsets of data.

DETAILED DESCRIPTION

Figure 1:
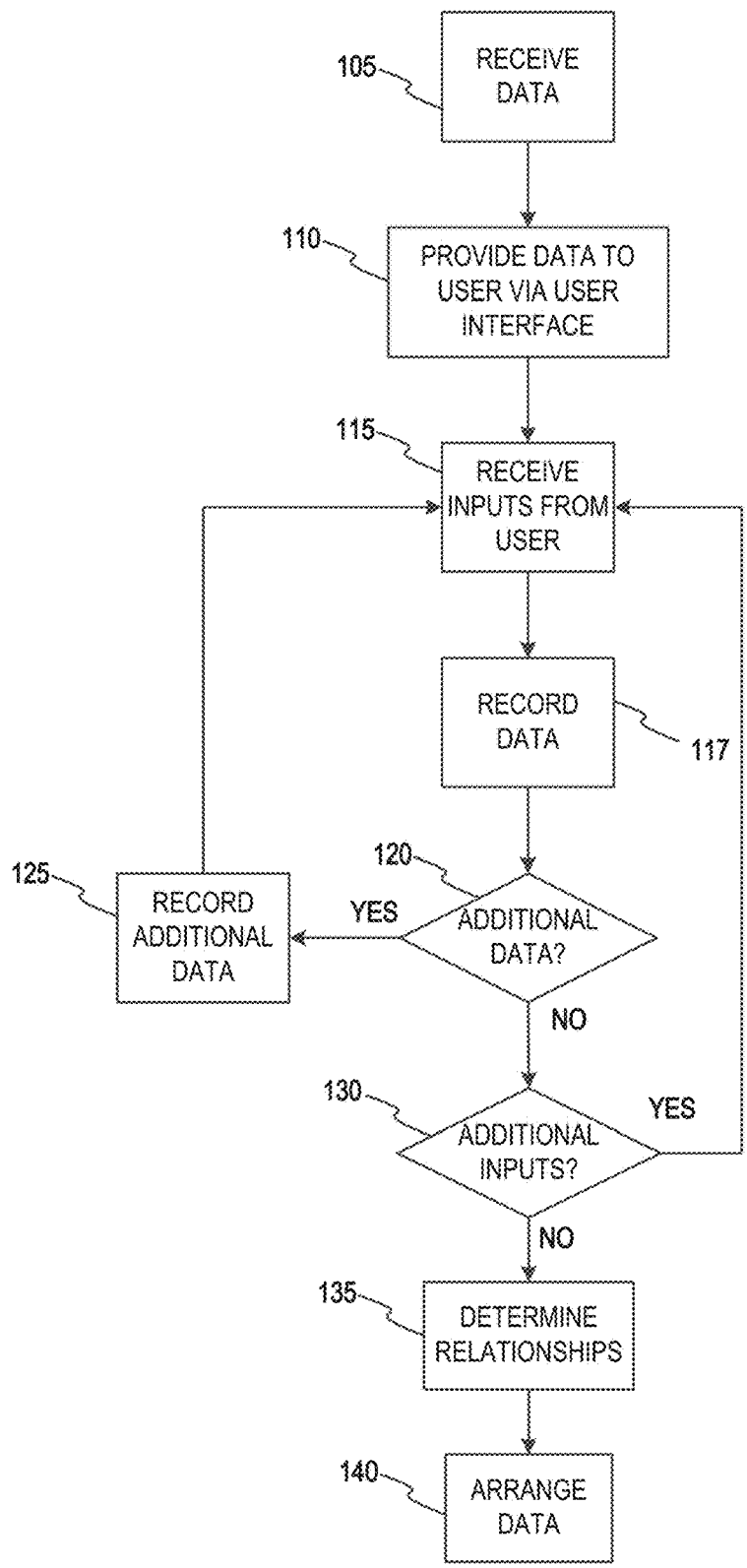
FIG. 1 depicts a flow diagram of a method of providing data and receiving inputs from a user according to an embodiment.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A "user" is not limited by this disclosure, and includes one or more entities or people using of any of the components and/or elements thereof as described herein. For example, a user can be a researcher, an expert, a player, an administrator, a developer, a group of individuals, and/or the like. In some embodiments, interactions between multiple users may be various users of the same category, such as, for example, multiple players, multiple researchers, multiple experts, multiple administrators, multiple developers, multiple groups, and/or the like. In some embodiments, interactions between multiple users may be various users of differing categories, such as, for example, a player and a researcher, a player and an expert, a player and an administrator, and/or the like.

An "electronic device" refers to a device that includes a processor and a tangible, computer-readable memory or storage device. The memory may contain programming instructions that, when executed by the processing device, cause the device to perform one or more operations according to the programming instructions. Examples of electronic devices include personal computers, supercomputers, gaming systems, televisions, mobile devices, medical devices, telescopes, satellites, recording devices, and/or the like.

A "mobile device" refers to an electronic device that is generally portable in size and nature, or is capable of being operated while in transport. Accordingly, a user may transport a mobile device with relative ease. Examples of mobile devices include pagers, cellular phones, feature phones, smartphones, personal digital assistants (PDAs), cameras, tablet computers, phone-tablet hybrid devices ("phablets"), laptop computers, netbooks, ultrabooks, global positioning satellite (GPS) navigation devices, in-dash automotive components, media players, watches, and the like.

A "computing device" is an electronic device, such as a computer, a processor, a memory, and/or any other component, device or system that performs one or more operations according to one or more programming instructions.

A "user interface" is an interface which allows a user to interact with a computer or computer system. The user interface may also be referred to as a "human interface device." A user interface may generally provide information or data to the user and/or receive information or data from the user. The user interface may enable input from a user to be received by the computer and may provide output to the user from the computer. Accordingly, the user interface may allow a user to control or manipulate a computer and may allow the computer to indicate the effects of the user's control or manipulation. The display of data or information on a display or a graphical user interface is a non-limiting example of providing information to a user. The receiving of data through a keyboard, mouse, trackball, touchpad, pointing stick, graphics tablet, joystick, gamepad, webcam, headset, gear sticks, steering wheel, pedals, wired glove, dance pad, remote control, and accelerometer are non-limiting examples of user interface components which enable the receiving of information or data from a user.

"Gameplay" refers to a specific way in which one or more users interact with a game. Gameplay can be a pattern defined through one or more game rules, a connection between a user and the game, a challenge presented to a user from the game, a method employed by a user in overcoming the challenges, a plot of the game, turn-by-turn directions in a game, a user's interaction with computer-generated characters and situations, a user's interaction with other users, and a user's connection to the game. The gameplay can be interesting, therapeutic, beneficial, and/or engaging to the user, thereby increasing the likelihood that the user interacts with the game for extended periods of time, provides high-quality inputs (for example, relevant and significant inputs), and returns to play the game multiple times.

A "game" refers to a board game, an electronic game, a gesture-based game, a massively multiplayer online game (MMOG), a social network-based game, and/or the like, and may further include any number of activities, exercises, and interactions. The game may be created by a software developer, an administrator, or the like. In some embodiments, creation of the game may be completed by a user based upon the user's interaction with another game. While the present disclosure generally relates to games for entertainment, those skilled in the art will recognize that the scope of the present disclosure may additionally relate to therapeutic exercises, learning and development exercises, medical diagnosis exercises, feedback gathering exercises, proof of human input systems, exercises for assessment and evaluation, interactive advertising, newsfeed gathering, personal content organization, and the like. Furthermore, the data collected from activities presented herein may further be used for purposes such as data mining, information retrieval, data organization, data sorting, data indexing, analytic gathering, known problems, and scientific problems. In some embodiments, the data may be used for advertising content customization and/or recommendations systems.

"Networked content," as used herein, refers to a plurality of data sets and/or subsets having a relationship to each other and/or a plurality of data sets/subsets that have a potential relationship to each other. For example, data sets/subsets that have a potential relationship to each other may be linked by a user and/or a computing device, thereby defining a relationship. Thus, for example, a first data set may be networked to a second data set depending on various interaction parameters described herein to connect the first data set to the second data set. In an illustrative example, a user may cause networked content to be created between a first data set containing a set of tasks, a second data set containing a set of dates, and a third data set containing a set of locations when the user adds an appointment on his/her calendar.

"User-visualizable" refers to data that is presented in a graphical format such that it is easily readable and understandable by a user. The user-visualizable data may easily be rearranged by the user, as described in greater detail herein. In some embodiments, the user-visualizable data may be presented in a polyhedron configuration, as described herein. In some embodiments, the user-visualizable data may be presented in a wheel configuration, as described herein. In some embodiments, the data may be presented in a grid configuration, as described herein.

A "polyhedron," as used herein, is a three dimensional object that is virtually provided to a user via a user interface. A polyhedron can have a plurality of faces. The number of faces on a polyhedron is not limited by this disclosure. Each face of a polyhedron may have a shape. For example, a face of a polyhedron may be triangular, rectangular, square, pentagonal, hexagonal, heptagonal, octagonal, and/or the like. Each face may be a regular shape or an irregular shape. A face may be of any size. In some embodiments, the polyhedron may have faces with varying shapes and sizes. Thus, for example, a polyhedron may be similar to that of a soccer ball, wherein the polyhedron comprises a plurality of hexagonal faces and a plurality of pentagonal faces. In other embodiments, the polyhedron may have faces with equal shapes and/or sizes, such as, for example, a cube having 6 equal square faces. In some embodiments, the polyhedron may be substantially spherical or spherical.

The present disclosure relates generally to systems and methods for presenting and/or discovering data in a manner that is easily viewed and manipulated by a user. A data set may be interrelated or networked to one or more other data sets and/or may be potentially interrelated or potentially networked to one or more other data sets. The systems and methods described herein may also allow for additional information to be provided in a smaller amount of space. In some embodiments, the data may be presented to the user, and the user's interactions with the data may be observed and recorded to determine connections between subsets of data and/or data sets. Once connections have been determined, the information may be arranged, categorized, and/or the like such that it is easily accessible. The systems and methods described herein may use one or more programming instructions stored on a storage device to direct a processor to present the data to a user.

FIG. 1 depicts a block diagram of a method of providing visualizable data to a user and receiving information based on a user's interactions with the data according to an embodiment. The method may include receiving 105 data. The data may be received 105 from any source and is not limited by this disclosure. For example, the data may be received from a data aggregator, from one or more user inputs, from a publicly available source, from a privately available source, and/or the like. In addition, the type of data is not limited by this disclosure, and may include any data that may correspond to content and/or information presented to a user, as described herein. For example, the data may correspond to text, photographs, videos, contact information, calendar information, software applications, folders, raw data, mathematical equations, chemical formulae, and/or the like.

In various embodiments, the data may be provided 110 to one or more users. In some embodiments, the data may be provided 110 to the one or more users via a user interface, as described in greater detail herein. In some embodiments, the data may be provided 110 in a graphical format such that a user can visualize the data and various connections between the data. For example, the data may be presented within one or more polyhedrons, within one or more wheel structures, and/or one or more grid structures as described in greater detail herein. In some embodiments, the data may be provided 110 in a physical format, such as, for example, in a freestanding advertisement comprising a plurality of physical polyhedrons, a plurality of physical wheel structures, and/or a plurality of physical grid structures. In some embodiments, the data may be provided 110 such that known connections between various portions of data and/or data sets are provided in the same polyhedron, in neighboring polyhedrons, in connected wheel structures, in adjacent grid spaces, or in some manner that is recognizable to a user as being related data, as described in greater detail herein.

In various embodiments, inputs may be received 115 from one or more users and the data obtained from the inputs may be recorded 117. The inputs may generally correspond to manipulation of a user interface, as described in greater detail herein. In some embodiments, the manipulation may include an addition of new data, which may be obtained from, for example, a user's movement of shapes in the user interface or input of new information, as described in greater detail herein. If new data is obtained, a determination 120 may be made that additional data has been included, and the additional data may be recorded 125 to a storage device. The process of receiving 115 additional inputs is repeated until a determination 130 is made that no additional inputs exist. Such a determination 130 may be made, for example, if a user ceases manipulation of the user interface, if an amount of time has elapsed, and/or the like.

If no additional inputs exist, various relationships between data may be determined 135. The determination 135 may be made, for example, based on the user inputs. For example, if a user groups a first data set/subset with a second data set/subset that were previously not known to have a relationship with each other, the computing device may make a determination 135 that a relationship now exists. In some embodiments, the determination 135 may be made after a plurality of users have indicated a relationship, thereby avoiding creation of relationships due to error or anomalies.

Since newly created relationships and/or newly removed relationships may cause a disarrangement of data, it may be necessary to arrange 140 and/or rearrange data based on the determined 135 relationships. Such an arrangement 140 may be used to ensure that the data is easily accessible and/or viewable when it is accessed in the future.

Figure 2:
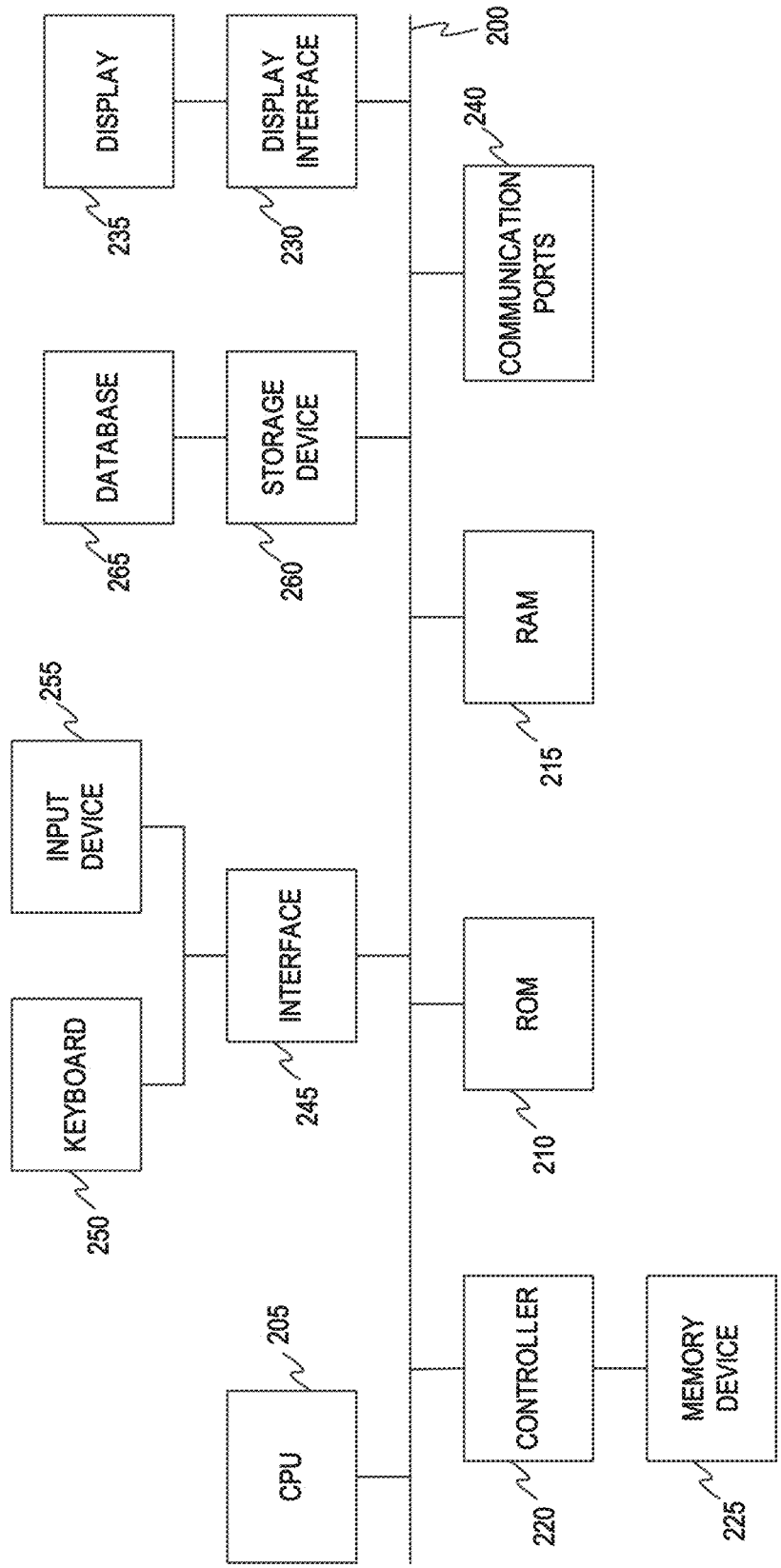
FIG. 2 depicts a block diagram of illustrative internal hardware that may be used to contain or implement program instructions according to an embodiment.

FIG. 2 depicts a block diagram of illustrative internal hardware that may be used to contain or implement program instructions, such as the process steps discussed herein, according to various embodiments. A bus 200 may serve as the main information highway interconnecting the other illustrated components of the hardware. A CPU 205 is the central processing unit of the system, performing calculations and logic operations required to execute a program. The CPU 205, alone or in conjunction with one or more of the other elements disclosed in FIG. 2, is an illustrative processing device, computing device or processor as such terms are used within this disclosure. Read only memory (ROM) 210 and random access memory (RAM) 215 constitute illustrative memory devices (i.e., processor-readable non-transitory storage media).

A controller 220 interfaces with one or more optional memory devices 225 to the system bus 200. These memory devices 225 may include, for example, an external or internal DVD drive, a CD ROM drive, a hard drive, flash memory, a USB drive, or the like. As indicated previously, these various drives and controllers are optional devices.

Program instructions, software, or interactive modules for providing the interface and performing any querying or analysis associated with one or more data sets may be stored in the ROM 210 and/or the RAM 215. Optionally, the program instructions may be stored on a tangible computer-readable medium such as a compact disk, a digital disk, flash memory, a memory card, a USB drive, an optical disc storage medium, such as a Blu-ray™ disc, and/or other non-transitory storage media.

An optional display interface 230 may permit information from the bus 300 to be displayed on the display 235 in audio, visual, graphic, or alphanumeric format, such as the interface previously described herein. Communication with external devices, such as a print device, may occur using various communication ports 240. An illustrative communication port 240 may be attached to a communications network, such as the Internet, an intranet, or the like.

The hardware may also include an interface 245 which allows for receipt of data from input devices such as a keyboard 250 or other input device 255 such as a mouse, a joystick, a touch screen, a remote control, a pointing device, a video input device and/or an audio input device.

The hardware may also include a storage device 260 such as, for example, a connected storage device, a server, and an offsite remote storage device. Illustrative offsite remote storage devices may include hard disk drives, optical drives, tape drives, cloud storage drives, and/or the like. The storage device 260 may be configured to store data as described herein, which may optionally be stored on a database 265. The database 265 may be configured to store information in such a manner that it can be indexed and searched, as described herein.

The computing device of FIG. 2 and/or components thereof may be used to carry out the various processes as described herein.

FIGS. 3-7 depict illustrative user interfaces according to various embodiments. The various user interfaces described herein are not limited by this disclosure, and may be provided on any type of device. Illustrative examples include a computing device, an electronic device, a mobile device, and a physical installation, such as a freestanding advertisement board or the like. Thus, a user may interact with the user interface by using an interface device such as a keyboard, a mouse, a touch screen, and/or the like, or by interacting with physical elements. The user interface may generally display information for the user in a manner that allows the user to visualize and/or manipulate the information. In some embodiments, the user interface may display information for the user such that the user can determine connections between subsets of the information. In some embodiments, the information may be displayed in a graphical format. In some embodiments, the information may be displayed in a gamified format. The illustrative user interfaces that may be used are described below.

Figure 3:
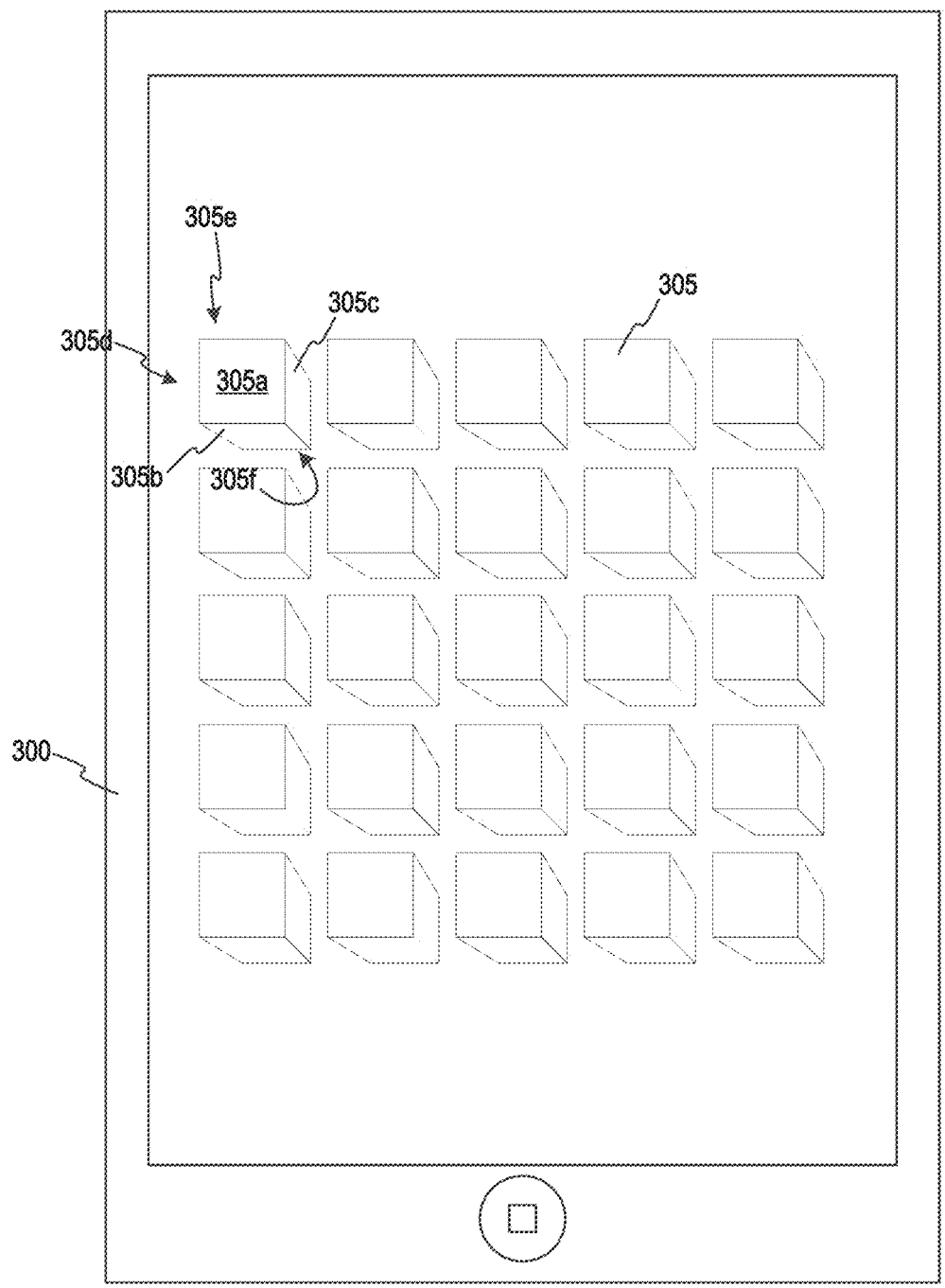
FIG. 3 depicts an illustrative user interface for providing visualizable data according to a first embodiment.

FIG. 3 depicts an illustrative user interface, generally designated 300, for providing visualizable data. In particular embodiments, the user interface 300 may display information for the user as one or more polyhedrons 305. In some embodiments, the one or more polyhedrons 305 may be a structured arrangement of polyhedrons, such as, for example, a Rubik's cube-type arrangement. Each of the one or more polyhedrons may contain a plurality of faces, such as, for example, 6 faces 305a-305f, where each face contains content and/or information. The content and/or information contained on the polyhedron 305 is not limited by this disclosure. The content and/or information may generally correspond to data, such as subsets of data and/or data sets in which it may be desirable to obtain information regarding connections between the subsets. Illustrative content and/or information may include, but is not limited to, text, photographs, videos, contact information, calendar information, software applications, folders, raw data, mathematical equations, chemical formulae, and/or the like. In addition, the amount of content and/or information is not limited by this disclosure, and may be any amount of content and/or information on each face of the polyhedron 305. In some embodiments, a face of the polyhedron 305 may be devoid of content and/or information. In some embodiments, a face of the polyhedron 305 may contain no content and/or information until it is provided by a user, as described in greater detail herein.

Each polyhedron 305 may be configured such that a user can manipulate the polyhedron to view, hide, input, amend, and/or delete portions of content and/or information contained on one or more faces. A user may generally manipulate a polyhedron 305 by inputting one or more commands. Illustrative commands may include, for example, performing one or more keystrokes, performing one or more mouse clicks, clicking and dragging, tapping with a finger, tapping and dragging with a finger, tapping with a stylus, tapping and dragging with a stylus, shaking an electronic device, voicing commands, providing gestures, and/or the like.

In some embodiments, the user may manipulate a polyhedron 305 by rotating the polyhedron. Rotation may occur in any direction to reveal a face. Rotation may include partial rotation to obtain one or more visual effects and/or controls. In some embodiments, one or more polyhedrons may rotate autonomously, whereby a user can stop each polyhedron once it has rotated to a desired position.

In some embodiments, a user may manipulate one or more polyhedrons 305 by moving each polyhedron around the display of the user interface 300. Thus, polyhedrons 305 may be exchanged, swapped, and/or moved from one location to another location by a user. In some embodiments, a user may manipulate one or more polyhedrons 305 by moving at least one first polyhedron adjacent to at least one second polyhedron (for example, to show connections by adjacency). In addition, a polyhedron 305 may be rearranged automatically based upon a user's movement of one or more other polyhedrons.

In some embodiments, a user may manipulate one or more polyhedrons 305 by inserting and/or deleting one or more polyhedrons. Insertion and/or deletion of a polyhedron 305 may cause other polyhedrons to be rearranged automatically based upon a location at which a user inserts and/or removes the polyhedron.

In some embodiments, a user may manipulate one or more polyhedrons 305 by shuffling one or more of the polyhedrons. In some embodiments, shuffling one or more of the polyhedrons may include randomly rearranging at least a portion of the polyhedrons in a different order. In some embodiments, shuffling may include randomly rotating at least a portion of each polyhedron. Shuffling may be completed when a user clicks on a button to shuffle the polyhedrons, enters a particular keystroke, shakes an electronic device, performs a gesture, voices a command, and/or the like. In some embodiments, shuffling may be guided or in response to a query. In some embodiments, shuffling may allow a user to visualize polyhedrons in a different order to discover new connections.

In some embodiments, a user may manipulate a polyhedron 305 by locking, unlocking, hiding, or revealing a polyhedron or at least a portion of a polyhedron. In some embodiments, locking or unlocking a polyhedron 305 may require input of a password, passcode, a gesture code, a biometric entry, and/or the like. In some embodiments, locking or hiding a polyhedron 305 may prevent one or more users from viewing the contents of at least a portion of the polyhedron. In some embodiments, locking or revealing a polyhedron 305 may allow one or more users to view the contents of at least a portion of the polyhedron.

In some embodiments, a user may manipulate a polyhedron 305 by focusing on the polyhedron. For example, a user may "zoom in" on a polyhedron 305 via the user interface such that portions of the polyhedron are enlarged. Such a "zoom in" functionality may allow for additional information to be stored on each face of the polyhedron 305. Additional information may include smaller polyhedrons within polyhedrons ("hyperpolyhedrons") wherein a user can drill down from a general polyhedron into one or more specific hyperpolyhedrons to obtain additional information.

In some embodiments, a user may manipulate one or more polyhedrons 305 by merging a plurality of polyhedrons into a single polyhedron. Similarly, in some embodiments, a user may manipulate a polyhedron 305 by splitting a single polyhedron into a plurality of polyhedrons.

In some embodiments, a user may manipulate a polyhedron 305 by manipulating various control elements that are located on or near the polyhedron. The control elements may generally be controls for any aspects of the polyhedron 305 that may be manipulated, including aspects described herein.

In some embodiments, a user may manipulate a polyhedron 305 by editing the content and/or information on a polyhedron. For example, a user may enter and/or delete text, attach items, embed items, and/or the like. Illustrative items may include photographs, videos, phone book entries, calendar entries, software applications, links to software applications, virtual folders, recorded conversations, and/or the like.

In some embodiments, a user may manipulate one or more polyhedrons 305 by connecting a path between polyhedrons and/or portions of polyhedrons. For example, a user may connect polyhedrons 305 and/or portions thereof that may potentially contain related information. Connecting a path between polyhedrons and/or portions of polyhedrons may include, for example, drawing a path between two related polyhedrons or portions of polyhedrons.

Figure 4:
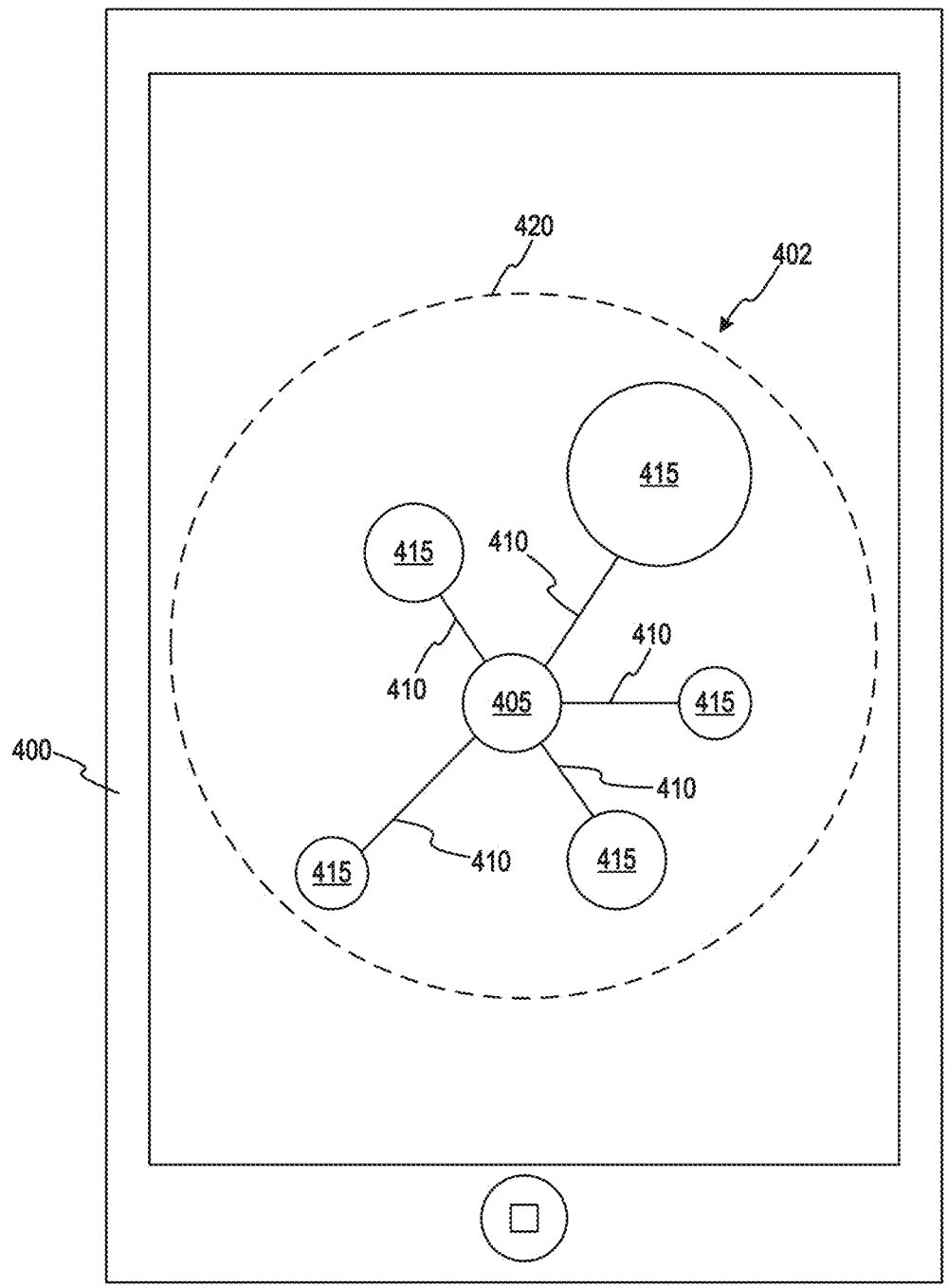
FIG. 4 depicts an illustrative user interface for providing visualizable data according to a second embodiment.
Figure 5:
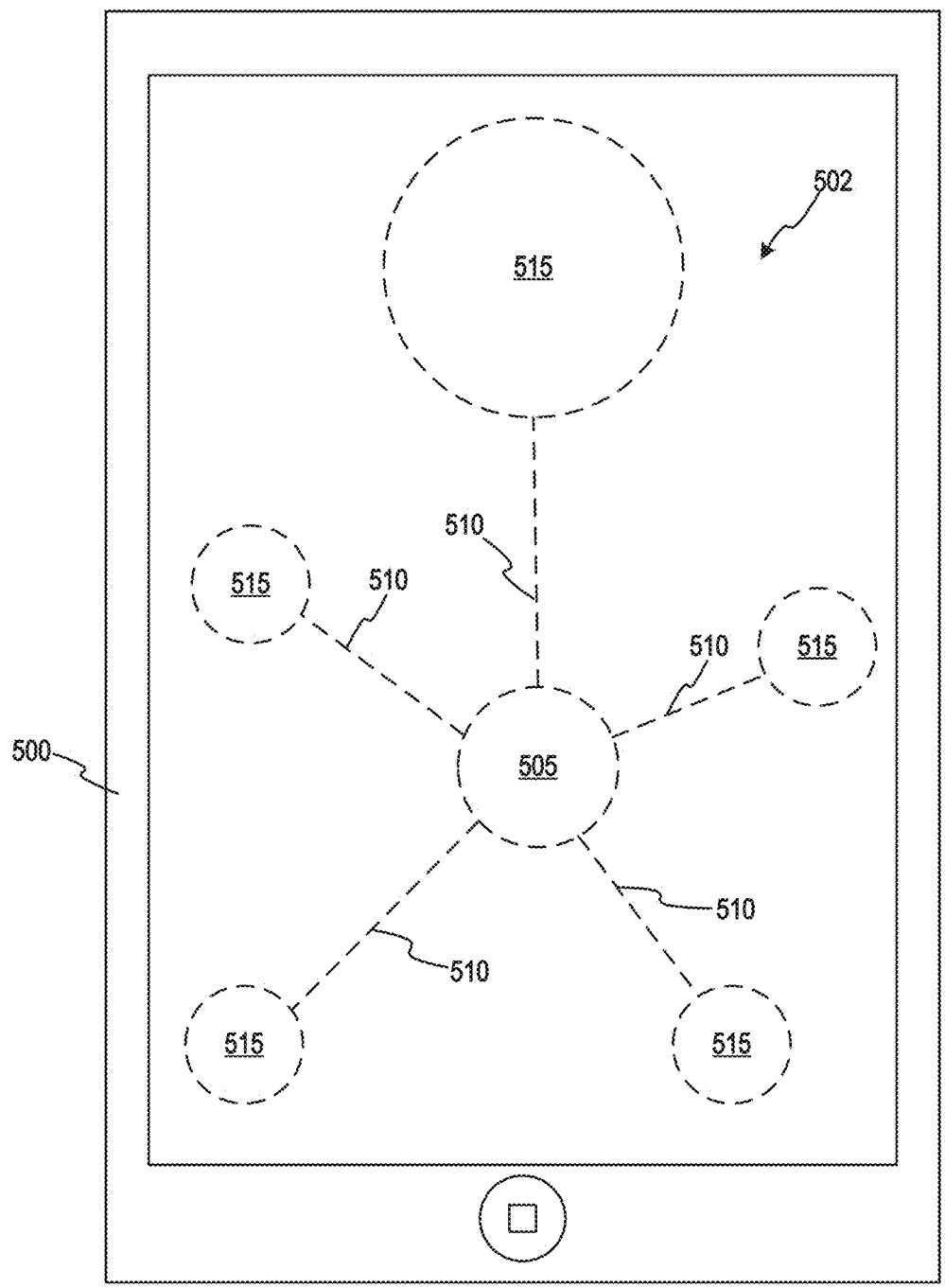
FIG. 5 depicts the user interface of FIG. 4 with a portion of the visualizable data hidden according to an embodiment.

FIG. 4 depicts an illustrative user interface, generally designated 400, for providing visualizable data. In particular embodiments, the user interface 400 may display information for the user as one or more wheels, generally designated 402. Each wheel may generally include a core 405 that is connected to a plurality of pads 415 surrounding the core via a plurality of spokes 410. Each pad 415 may generally have a spoke 410 associated therewith. Each pad 415 may generally correspond to a resource, a data subset, and/or a data set. In some embodiments, the wheel 402 may have a plurality of spokes 410 in varying lengths, and a circumference of the wheel may be determined by the spoke having the longest length. In some embodiments, a halo 420 may be incorporated to improve ease of manipulation of the wheel 402, as described in greater detail herein. In some embodiments, a halo 420 of a first wheel 402 may be adjacent to a halo of a second wheel such that the wheels can act as gears, such that movement of one wheel drives a corresponding movement of the other wheel (and any other wheels arranged accordingly).

A plurality of wheels 402 may allow for visualization and manipulation of relationships and constraints across wheels by a user. For example, a user may rotate one or more wheels 402 to positionally align a pad 415 of a first wheel with a pad of a second wheel. Positional alignment of pads 415 may allow a user to bring related and/or potentially related data sets adjacent to each other. In some embodiments, positional alignment of pads 415 may include placing pads adjacent to one another. In some embodiments, positional alignment of pads 415 may include intersecting pads, such as, for example, overlapping pads or causing a first pad to at least partially encompass a second pad. In some embodiments, particular positional alignments of pads 415 may cause a "focus view" that causes additional data to be displayed to a user when the user positionally aligns particular pads together. For example, if a first wheel contains data sets of shirts and a second wheel contains data sets of pants, and the user positionally aligns a particular shirt with a particular pair of pants, the computing device may determine that the two match and may display an indication of such a match to the user. In some embodiments, a user may manipulate a plurality of wheels 402 and/or a plurality of pads 415 by bringing the pads/wheels in close proximity to each other to indicate a connection by adjacency.

Each spoke 410 may generally have a length, a thickness, and/or a color. In some embodiments, the length and/or the thickness of a spoke 410 may correspond to additional data and/or may correspond to a strength of a relationship of data. For example, a spoke 410 that is shorter may indicate a closer relationship between the data set in the corresponding pad 415 and the data set in the core 405, whereas a spoke that is longer may indicate a relationship that is not as close between the data sets. In some embodiments, the length of each spoke 410 may be modified by a user. The length of each spoke 410 may generally be modified for any number of purposes, such as, for example, examining the connecting pad 415, connecting the connecting pad to a pad on a second wheel 402, and/or indicating a relationship between a pad and a core 405.

In some embodiments, each spoke 410 may have a directionality. In such embodiments, the spoke may be depicted as an arrow or the like to indicate the directionality of the spoke. The directionality may refer to, for example, a directional relationship or a dependency.

Each pad 415 may generally have a size. In some embodiments, the size of the pad 415 may correspond to a feature of the data set contained within that pad. For example, larger data sets may be encompassed in larger pads 415, whereas smaller data sets may be encompassed in smaller pads.

In some embodiments, positioning of pads 415 on the wheel 402 may correspond to an ordering of data sets. Thus, for example, if a plurality of data sets are in sequential order, they may each be placed in a corresponding pad 415 in sequential order around the core 405. In addition, pads 415 may be configured to be swappable or reorderable by a user, such as, for example, in instances where a user may desire to change the ordering of the pads around the core 405.

In various embodiments, each pad 415 may be manipulable by a user. For example, if a pad 415 is tapped or swiped, the remainder of the wheel 402 may shrink and/or the pad may increase in size such that the user can easily view the data contained therein. In some embodiments, the pad 415 may increase in size to reveal a new wheel therein, such as instances where a data set contains various subsets that are each incorporated within sub-pads. In some embodiments, the wheel 402 may be configured to receive an inward pinching or swiping motion from a user that causes at least a portion of the pads 415 to collapse so only the core 405 is visible. Conversely, the wheel 402 may further be configured to receive an outward pinching or swiping motion from a user that causes at least a portion of the pads 415 to be restored so that they can be viewed. In another example, each wheel 402 and/or portion thereof may be manipulable using gestures (such as, for example, multi-touch) to separate out a portion of the wheel (for example, a pad 415) from the remainder of the wheel (for example, the core 405) for convenience and/or ease of viewing various content. For example, a pinch out gesture (with one indicator on a core and another on a pad) may stretch the spoke connecting the core and the pad such that the core and other pads shrink, thereby allowing a pad to be moved to the center of a temporary wheel.

Each core 405 and/or wheel 402 may be in a two-dimensional or a three-dimensional configuration. For example, the core 405 and/or the wheel 402 may be a square, a circle, a cube, a sphere, and/or the like. In some embodiments, when the core 405 is in a three-dimensional configuration, the spokes 410 may extend from the core in any direction such that the wheel 402 has a spherical shape.

In various embodiments, a plurality of wheels 402 may be in a stacked configuration such that a wheel is stacked on top of another wheel. Stacking of wheels 402 may be completed, for example, to show a relationship between data sets in each wheel. In some embodiments, a wheel 402 may be movable by a user to bring the wheel adjacent to another wheel, to link wheels, and/or to stack wheels. In addition, wheels 402 may be movable into a pad 415 of a second wheel, as described in greater detail herein.

In some embodiments, each wheel 402 may be cloned such that the contents of each wheel and/or the components thereof are easier for a user to view and manipulate. For example, in instances where a wheel 402 contains a large number of pads 415 connected to the core 405, the wheel may be cloned such that only a portion of the pads is viewed and organized by a user at one time. Accordingly, cloning of the wheel 402 may allow for a user to view intra-wheel relationships.

In some embodiments, new wheels 402 and/or components thereof may be creatable by a user. For example, if a user discovers a data set from one or more pads 415 of a first wheel 402 and one or more pads from a second wheel and decides to add them together in a new grouping, the user may do so by creating a new core 405 and linking the pads to the new core. In some embodiments, creation of a new wheel 402 may be done on a temporary basis, similar to that of copying items to a clipboard.

Figure 6:
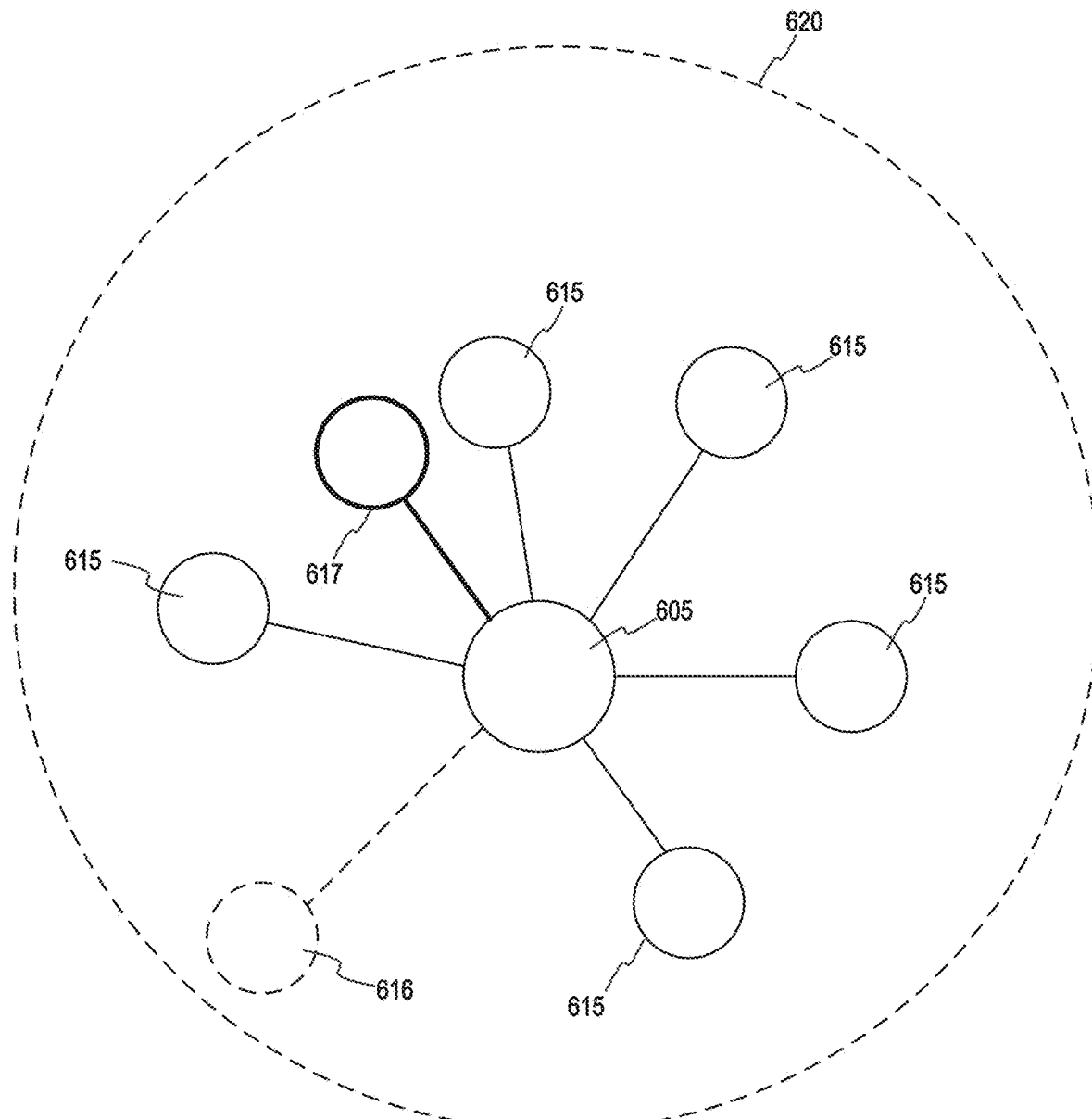
FIG. 6 depicts the user interface of FIG. 4 with a portion of the visualizable data hidden and a portion of the visualizable data revealed according to an embodiment.

In various embodiments, the wheel 402 may contain a large amount of data, but may only be configured to display a particular number of pads 415 that is insufficient to present all of the data. Accordingly, at least a portion of the data may be hidden. Thus, as indicated by the dashed lines in FIG. 5, at least a portion of the wheel core 505, spokes 510, and pads 515 may be hidden and/or invisible. The wheel 502 may be configured to display the hidden content when it receives certain inputs from the user. For example, a user may rotate the wheel 502 to display certain hidden content. As shown in FIG. 6, a pad 616 may become hidden (as indicated by the dashed lines) and a hidden pad 617 may be displayed (as indicated by the bold lines) when the user provides an interaction to cause the pads to hide or become visible. Referring back to FIG. 5, in another example, one of the pads 515 may be configured to act as a "control" element, such that a user manipulation of a pad causes remaining portions of the wheel 502 to be hidden and/or revealed.

Figure 7:
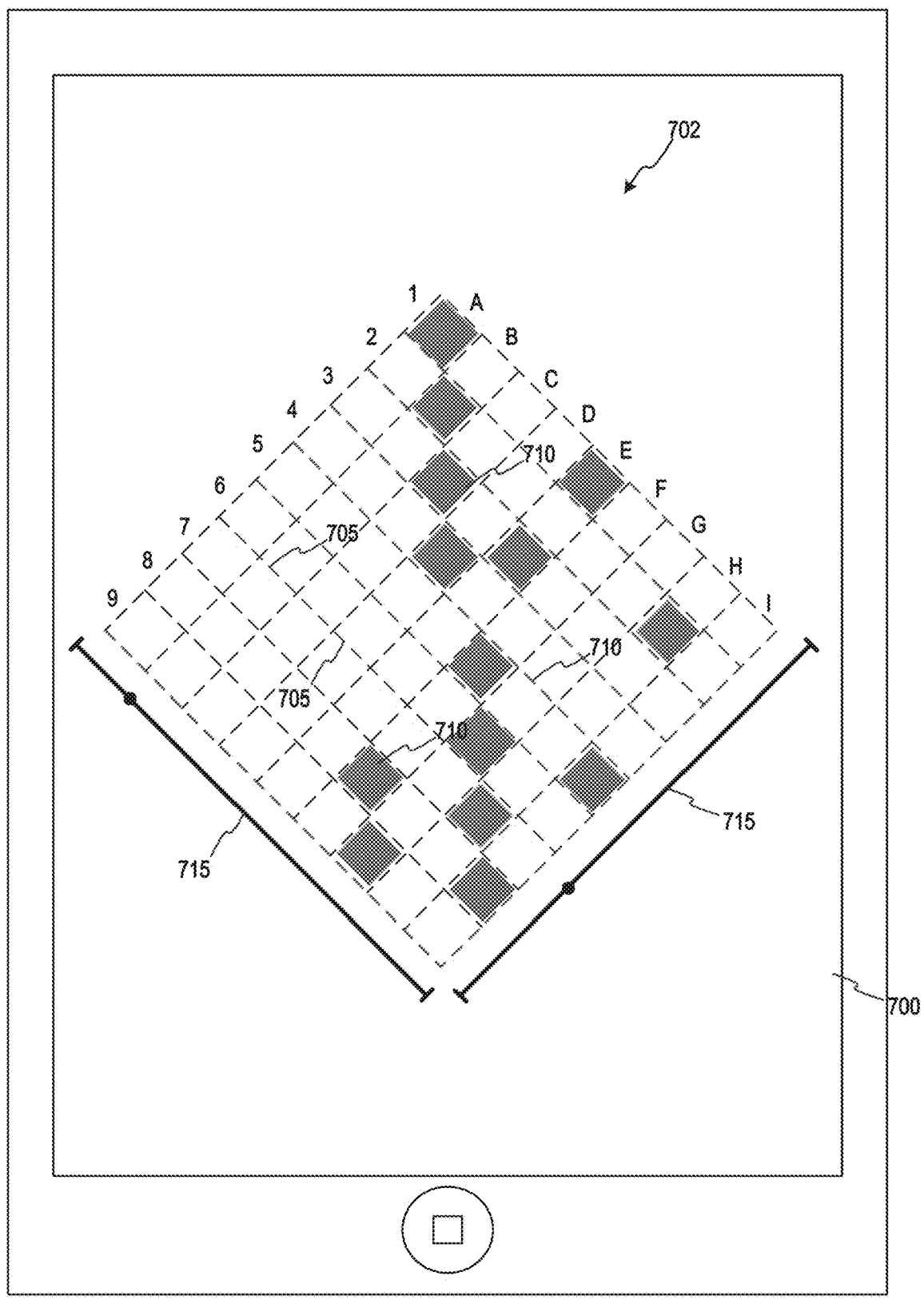
FIG. 7 depicts an illustrative user interface for providing visualizable data according to a third embodiment.

FIG. 7 depicts an illustrative user interface, generally designated 700, for providing visualizable data. In particular embodiments, the user interface 700 may display information for the user as one or more grids, generally designated 702. Each grid 702 may include a plurality of rows 1-9 and a plurality of columns A-I that may be defined by a plurality of grid lines 705. The rows 1-9 and the columns A-I may each contain a descriptive element. An intersection of a particular row with a particular column may contain data corresponding to the descriptive element of that particular row and that particular column.

In some embodiments, a grid may have a two-dimensional (2D) configuration. In such a configuration, the grid may appear similar to a chess board. In some embodiments, a grid may have a three-dimensional (3D) configuration. In such a configuration, the grid may be in a cube format. Thus, each face of the cube may be a grid and each slice of the cube may be a grid.

In some embodiments, the columns and the rows of a grid may have hierarchies. Such a hierarchal grid configuration may be similar to that of a pivot table with categories on each side. In a hierarchal grid configuration, portions of the grid may be rolled up and drilled down to obtain generalized and detailed information, respectively. Thus, in various embodiments, each intersection of a column and a row may be drilled down into a sub-grid such that the user can obtain additional data sets, subsets, and/or the like. In some embodiments, an indication of whether a sub-grid exists may be indicated by a modified cell 710, such as, for example, a shaded or colored cell. In some embodiments, a sub-grid may be separated out from the remainder of the grid and/or joined with another grid (or portion thereof).

In some embodiments, only a portion of a grid 702 may be visible due to the size of the grid. In such embodiments, the interface 700 may incorporate one or more navigational devices 715, such as sliders and/or the like to move the grid 702 and or portions thereof, to highlight areas where sub-grids are located, to zoom in and zoom out, and/or the like.

In some embodiments, an intersection of a particular column with a particular row may be colorable. In such embodiments, a color of an intersection may be an indicator of a relationship that has been created or removed between the various items of the column with the various items of the row.

Each grid 702, sub-grid, and/or components thereof may be configured to respond to various commands from a user. Illustrative commands may include, but are not limited to, drill down, roll up, hide, select, filter, and combine. A drill down command may allow sub-grids to be displayed. Conversely, a roll up command may allow for a higher level category to be displayed. A hide command may allow for one or more portions of the grid 702 to be hidden, such as a column or a row. A select command may allow for any portion of a grid 702 of be selected, such as, for example, for a user to view data contained within the selected portion. A filter command may show portions of a grid 702 and hide other portions of a grid according to a selected filter. A combine command may allow portions of a grid 702 to be combined together.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A system comprising:
    a processor; and
    a non-transitory, processor-readable storage medium, wherein the non-transitory, processor-readable storage medium comprises one or more programming instructions that, when executed, cause the processor to:
        provide stored data to one or more users via a user interface, wherein the stored data is presented in a user-visualizable format, and wherein the user-visualizable format comprises one or more shapes,
        receive one or more inputs from at least one of the one or more users via the user interface, wherein the one or more inputs correspond to the user's interaction with the user interface that causes manipulation of the stored data, and wherein the user's interaction comprises a non-isometric transformation of at least a portion of at least one first shape of the one or more shapes representing one or more first subsets of the stored data relative to at least one of:
            at least a portion of the at least one first shape of the one or more shapes representing one or more second subsets of the stored data, and
            at least a portion of at least one second shape of the one or more shapes representing one or more third subsets of the stored data,
        the manipulation of the stored data comprising modifying the stored data based on additional data, wherein the additional data is received from at least one of: the one or more inputs, a data aggregator, a publicly available source, and a privately available source; and
        record the modified data, thereby updating the stored data.

2. The system of claim 1, further comprising one or more programming instructions that, when executed, cause the processor to:
    evaluate one or more relationships between the one or more first and at least one of the one or more second and third subsets of the stored data based upon the one or more inputs, and
    arrange the stored data according to the one or more relationships.

3. The system of claim 1, wherein the user interface comprises one or more polyhedrons, and wherein a face of a polyhedron contains at least a portion of the stored data.

4. The system of claim 3, wherein at least one of the one or more inputs correspond to one or more manipulations of the one or more polyhedrons by the at least one of the one or more users.

5. The system of claim 1, wherein the user interface comprises one or more wheels having one or more core portions and one or more pad portions, and wherein at least one of the one or more core portions and the one or more pad portions comprises at least a portion of the stored data.

6. The system of claim 5, wherein at least one of the one or more inputs correspond to one or more manipulations of the one or more wheels by the at least one of the one or more users.

7. The system of claim 1, wherein the user interface comprises one or more grids comprising a plurality of rows and a plurality of columns, and wherein at least one of the plurality of rows and at least one of the plurality of columns contains at least a portion of the stored data.

8. The system of claim 7, wherein at least one of one or more inputs correspond to one or more manipulations of the one or more grids by the at least one of the one or more users.

9. The system of claim 1, wherein at least one of the one or more shapes that comprise the user-visualizable format further comprises one or more additional shapes.

10. The system of claim 1, wherein the user's interaction further comprises the creation of one or more additional shapes representing at least one of the stored data or the additional data.

11. A system comprising:
a processor; and
a non-transitory, processor-readable storage medium, wherein the non-transitory, processor-readable storage medium comprises one or more programming instructions that, when executed, cause the processor to:
provide stored data to one or more users via a user interface, wherein the stored data is presented in a user-visualizable format,
receive one or more inputs from at least one of the one or more users via the user interface that causes active manipulation comprising a non-isometric transformation of the stored data, wherein the one or more inputs correspond to one or more user-discovered relationships between two or more subsets of the stored data, the manipulation of the stored data comprising modifying the stored data based on additional data, wherein the additional data is received from at least one of: the one or more inputs, a data aggregator, a publicly available source, and a privately available source; and
record the modified data, thereby updating the stored data.

12. The system of claim 11, further comprising one or more programming instructions that, when executed, cause the processor to:
evaluate one or more relationships between the two or more subsets of the stored data based upon the one or more inputs, and
arrange the stored data according to the one or more relationships.

13. The system of claim 11, wherein the user interface comprises one or more polyhedrons, and wherein a face of a polyhedron contains at least a portion of the stored data.

14. The system of claim 13, wherein at least one of the one or more inputs correspond to one or more manipulations of the one or more polyhedrons by the at least one of the one or more users.

15. The system of claim 11, wherein the user interface comprises one or more wheels having one or more core portions and one or more pad portions, and wherein at least one of the one or more core portions and at least one of the one or more pad portions comprises at least a portion of the stored data.

16. The system of claim 15, wherein at least one of the one or more inputs correspond to one or more manipulations of the one or more wheels by the at least one of the one or more users.

17. The system of claim 11, wherein the user interface comprises one or more grids comprising a plurality of rows and a plurality of columns, and wherein at least one of the plurality of rows and at least one of the plurality of columns contains at least a portion of the stored data.

18. The system of claim 17, wherein at least one of the one or more inputs correspond to one or more manipulations of the one or more grids by the at least one of the one or more users.

19. A method comprising:
providing, by a processor, stored data to one or more users via a user interface, wherein the stored data is presented in a user-visualizable format;
receiving, by the processor, one or more inputs from at least one of the one or more users, wherein the one or more inputs correspond to the user's interaction with the user interface that directly causes dynamic manipulation comprising a non-isometric transformation of the stored data, the manipulation of the stored data comprising modifying the stored data based on additional data, wherein the additional data is received from at least one of: the one or more inputs, a data aggregator, a publicly available source, and a privately available source; and
recording, by the processor, in at least one storage medium the modified data, thereby updating the stored data.

20. The method of claim 19, further comprising:
evaluating, by the processor, one or more relationships between the one or more subsets of the stored data based upon the one or more inputs; and
arranging, by the processor, the stored data according to the one or more relationships.

21. The method of claim 19, wherein the user interface comprises one or more polyhedrons, wherein a face of a polyhedron contains at least a portion of the stored data, and wherein at least one of the one or more inputs correspond to one or more manipulations of the one or more polyhedrons by the at least one of the one or more users.

22. The method of claim 19, wherein the user interface comprises one or more wheels having one or more core portions and one or more pad portions, wherein at least one of the one or more core portions and at least one of the one or more pad portions comprises at least a portion of the stored data, and wherein at least one of the one or more inputs correspond to one or more manipulations of the one or more wheels by the at least one of the one or more users.

23. The method of claim 19, wherein the user interface comprises one or more grids comprising a plurality of rows and a plurality of columns, wherein at least one of the plurality of rows and at least one of the plurality of columns contains at least a portion of the stored data, and wherein at least one of the one or more inputs correspond to one or more manipulations of the one or more grids by the at least one of the one or more users.

24. A method comprising:
providing, by a processor, stored data to one or more users via a user interface, wherein the stored data is presented in a user-visualizable format, and wherein the user-visualizable format comprises one or more shapes,
receiving, by the processor, one or more inputs from at least one of the one or more users via the user interface, wherein the one or more inputs correspond to the user's interaction with the user interface that causes manipulation of the stored data, and wherein the user's interaction comprises a non-isometric transformation of at least a portion of at least one first shape of the one or more shapes representing one or more first subsets of the stored data relative to at least one of:
at least a portion of the at least one first shape of the one or more shapes representing one or more second subsets of the stored data, and
at least a portion of at least one second shape of the one or more shapes representing one or more third subsets of the stored data,
the manipulation of the stored data comprising modifying the stored data based on additional data, wherein the additional data is received from at least one of: the one or more inputs, a data aggregator, a publicly available source, and a privately available source; and
recording, by the processor, in at least one storage medium, the modified data, thereby updating the stored data.

25. The method of claim 24, further comprising:
evaluating, by the processor, one or more relationships between the one or more first subsets and at least one of the one or more second subsets and the one or more third subsets of the stored data based upon the one or more inputs; and
arranging, by the processor, the stored data according to the one or more relationships.

26. The method of claim 24, wherein the user interface comprises one or more polyhedrons, and wherein a face of a polyhedron contains at least a portion of the stored data.

27. The method of claim 26, wherein at least one of the one or more inputs correspond to one or more manipulations of the one or more polyhedrons by the at least one of the one or more users.

28. The method of claim 24, wherein the user interface comprises one or more wheels having one or more core portions and one or more pad portions, and wherein at least one of the one or more core portions and the one or more pad portions comprises at least a portion of the stored data.

29. The method of claim 28, wherein at least one of the one or more inputs correspond to one or more manipulations of the one or more wheels by the at least one of the one or more users.

30. The method of claim 24, wherein the user interface comprises one or more grids comprising a plurality of rows and a plurality of columns, and wherein at least one of the plurality of rows and at least one of the plurality of columns contains at least a portion of the stored data.

31. The method of claim 30, wherein at least one of one or more inputs correspond to one or more manipulations of the one or more grids by the at least one of the one or more users.

32. The method of claim 24, wherein at least one of the one or more shapes that comprise the user-visualizable format further comprises one or more additional shapes.

33. The method of claim 24, wherein the user's interaction further comprises the creation of one or more additional shapes representing at least one of the stored data or the additional data.

* * * * *